US006895449B2

(12) United States Patent
Tasler

(10) Patent No.: US 6,895,449 B2
(45) Date of Patent: May 17, 2005

(54) FLEXIBLE INTERFACE FOR COMMUNICATION BETWEEN A HOST AND AN ANALOG I/O DEVICE CONNECTED TO THE INTERFACE REGARDLESS THE TYPE OF THE I/O DEVICE

(75) Inventor: Michael Tasler, Wuerzburg (DE)

(73) Assignee: Labortechnik Tasler GmbH, Wuerzburg (DE)

( * ) Notice: Subject to any disclaimer, the term of this patent is extended or adjusted under 35 U.S.C. 154(b) by 369 days.

(21) Appl. No.: 10/219,105

(22) Filed: Aug. 15, 2002

(65) Prior Publication Data

US 2002/0199037 A1 Dec. 26, 2002

Related U.S. Application Data

(62) Division of application No. 09/331,002, filed on Jun. 14, 1999.

(30) Foreign Application Priority Data

Mar. 4, 1997 (DE) .......................................... 197 08 755
Mar. 3, 1998 (EP) ................................. PCT/EP98/01187

(51) Int. Cl.[7] .............................................. G06F 13/14
(52) U.S. Cl. .............................. 710/16; 710/8; 710/64; 709/220
(58) Field of Search ................................ 710/8, 16, 64, 710/11, 12, 15, 62, 63; 703/23, 24, 25; 709/220, 222

(56) References Cited

U.S. PATENT DOCUMENTS

| | | | | | |
|---|---|---|---|---|---|
| 5,548,783 | A | * | 8/1996 | Jones et al. ................... | 710/16 |
| 5,596,628 | A | * | 1/1997 | Klein ....................... | 379/93.11 |
| 5,628,030 | A | * | 5/1997 | Tuckner ..................... | 710/64 |
| 6,012,113 | A | * | 1/2000 | Tuckner ..................... | 710/64 |
| 6,266,711 | B1 | * | 7/2001 | Ishikawa et al. ............... | 710/8 |
| 6,363,081 | B1 | * | 3/2002 | Gase .......................... | 370/466 |
| 6,725,293 | B1 | * | 4/2004 | Nakayama et al. ........... | 710/36 |
| 6,728,844 | B2 | * | 4/2004 | Sanada et al. .............. | 711/152 |

* cited by examiner

Primary Examiner—Jeffrey Gaffin
Assistant Examiner—Harold Kim
(74) Attorney, Agent, or Firm—Glenn Patent Group; Michael A. Glenn

(57) ABSTRACT

An interface device (10) provides fast data communication between a host device with input/output interfaces and a data transmit/receive device, wherein the interface device (10) comprises a processor means (13), a memory means (14), a first connecting device (12) for interfacing the host device with the interface device, and a second connecting device (15) for interfacing the interface device (10) with the data transmit/receive device. The interface device (10) is configured by the processor means (13) and the memory means (14) in such a way that, when receiving an inquiry from the host device via the first connecting device (12) as to the type of a device attached to the host device, regardless of the type of the data transmit/receive device, the interface device sends a signal to the host device via the first connecting device (12) which signals to the host device that it is communicating with an input/output device.

18 Claims, 2 Drawing Sheets

Figure 1:
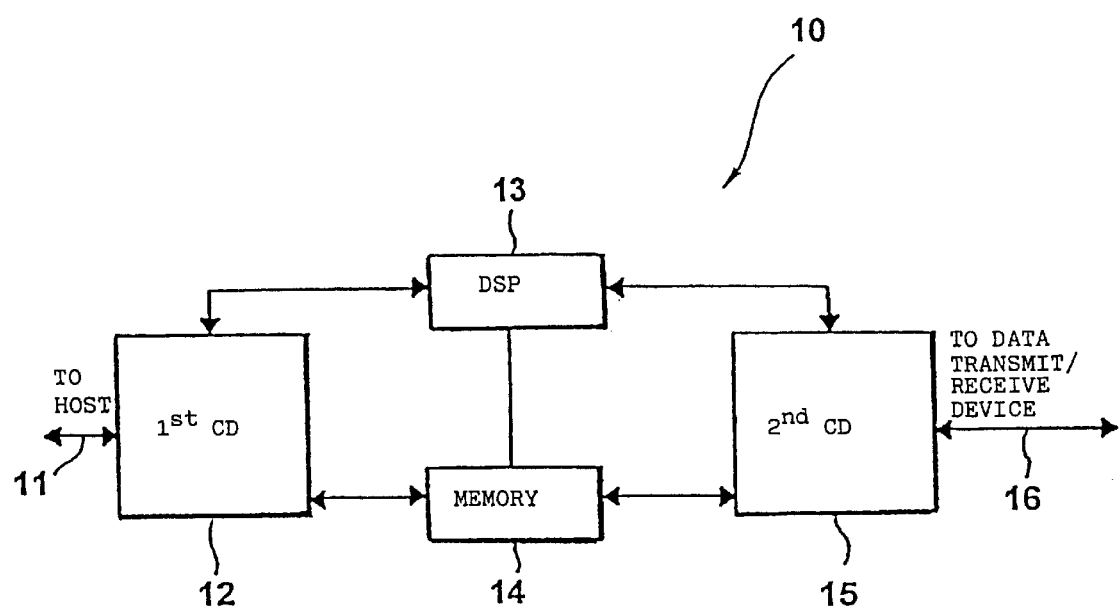

FLEXIBLE INTERFACE FOR COMMUNICATION BETWEEN A HOST AND AN ANALOG I/O DEVICE CONNECTED TO THE INTERFACE REGARDLESS THE TYPE OF THE I/O DEVICE

RELATED APPLICATIONS

This application is a divisional application of copending application Ser. No. 09/331,002 filed Jun. 14, 1999.

DESCRIPTION

The present invention relates to the transfer of data and in particular to interface devices for communication between a computer or host device and a data transmit/receive device from which data is to be acquired or with which two-way communication is to take place.

Existing data acquisition systems for computers are very limited in their areas of application. Generally such systems can be classified into two groups.

In the first group host devices or computer systems are attached by means of an interface to a device whose data is to be acquired. The interfaces of this group are normally standard interfaces which, with specific driver software, can be used with a variety of host systems. An advantage of such interfaces is that they are largely independent of the host device. However, a disadvantage is that they generally require very sophisticated drivers which are prone to malfunction and which limit data transfer rates between the device connected to the interface and the host device and vice versa. Further, it is often very difficult to implement such interfaces for portable systems and they offer few possibilities for adaptation with the result that such systems offer little flexibility.

The devices from which data is to be acquired cover the entire electrical engineering spectrum. In a typical case, it is assumed that a customer who operates, for example, a diagnostic radiology system in a medical engineering environment reports a fault. A field service technician of the system manufacturer visits the customer and reads system log files generated by the diagnostic radiology system by means a portable computer or laptop for example. If the fault cannot be localized or if the fault is intermittent, it will be necessary for the service technician to read not only an error log file but also data from current operation. It is apparent that in this case fast data transfer and rapid data analysis are necessary.

Another case requiring the use of an interface could be, for example, when an electronic measuring device, e.g. a multimeter, is attached to a computer system to transfer the data measured by the multimeter to the computer. Particularly when long-term measurements or large volumes of data are involved is it necessary for the interface to support a high data transfer rate.

From these randomly chosen examples it can be seen that an interface may be put to totally different uses. It is therefore desirable that an interface be sufficiently flexible to permit attachment of very different electrical or electronic systems to a host device by means of the interface. To prevent operator error, it is also desirable that a service technician is not required to operate different interfaces in different ways for different applications but that, if possible, a universal method of operating the interface be provided for a large number of applications.

To increase the data transfer rates across an interface, the route chosen in the second group of data acquisition systems for the interface devices was to specifically match the interface very closely to individual host systems or computer systems. The advantage of this solution is that high data transfer rates are possible. However, a disadvantage is that the drivers for the interfaces of the second group are very closely matched to a single host system with the result that they generally cannot be used with other host systems or their use is very ineffective. Further, such types of interface have the disadvantage that they must be installed inside the computer casing to achieve maximum data transfer rates as they access the internal host bus system. They are therefore generally not suitable for portable host systems in the form of laptops whose minimum possible size leaves little internal space to plug in an interface card.

A solution to this problem is offered by the interface devices of IOtech (business address: 25971 Cannon Road, Cleveland, Ohio 44146, USA) which are suitable for laptops such as the WaveBook/512 (registered trademark). The interface devices are connected by means of a plug-in card, approximately the size of a credit card, to the PCMCIA interface which is now a standard feature in laptops. The plug-in card converts the PCMCIA interface into an interface known in the art as IEEE 1284. The said plug-in card provides a special printer interface which is enhanced as regards the data transfer rate and delivers a data transfer rate of approximately 2 MBps as compared with a rate of approx. 1 MBps for known printer interfaces. The known interface device generally consists of a driver component, a digital signal processor, a buffer and a hardware module which terminates in a connector to which the device whose data is to be acquired is attached. The driver component is attached directly to the enhanced printer interface thus permitting the known interface device to establish a connection between a computer and the device whose data is to be acquired.

In order to work with the said interface, an interface-specific driver must be installed on the host device so that the host device can communicate with the digital signal processor of the interface card. As described above, the driver must be installed on the host device. If the driver is a driver developed specifically for the host device, a high data transfer rate is achieved but the driver cannot be easily installed on a different host system. However, if the driver is a general driver which is as flexible as possible and which can be used on many host devices, compromises must be accepted with regard to the data transfer rate.

Particularly in an application for multi-tasking systems in which several different tasks such as data acquisition, data display and editing are to be performed quasi-simultaneously, each task is normally assigned a certain priority by the host system. A driver supporting a special task requests the central processing system of the host device for processor resources in order to perform its task. Depending on the particular priority assignment method and on the driver implementation, a particular share of processor resources is assigned to a special task in particular time slots. Conflicts arise if one or more drivers are implemented in such a way that they have the highest priority by default, i.e. they are incompatible, as happens in practice in many applications. It may occur that both drivers are set to highest priority which, in the worst case, can result in a system crash.

EP 0685799 A1 discloses an interface by means of which several peripheral devices can be attached to a bus. An interface is connected between the bus of a host device and various peripheral devices. The interface comprises a finite state machine and several branches each of which is assigned to a peripheral device. Each branch comprises a data manager, cycle control, user logic and a buffer. This known interface device provides optimal matching between a host device and a specific peripheral device.

The specialist publication IBM Technical Disclosure Bulletin, Vol. 38, No. 05, page 245; "Communication Method between Devices through FDD Interface" discloses an interface which connects a host device to a peripheral device via a floppy disk drive interface. The interface consists in particular of an address generator, an MFM encoder/decoder, a serial/parallel adapter and a format signal generator. The interface makes it possible to attach not only a floppy disk drive but also a further peripheral device to the FDD host controller of a host device. The host device assumes that a floppy disk drive is always attached to its floppy disk drive controller and communication is initiated if the address is correct. However, this document contains no information as to how communication should be possible if the interface is connected to a multi-purpose interface instead of to a floppy disk drive controller.

It is the object of the present invention to provide an interface device for communication between a host device and a data transmit/receive device whose use is host device-independent and which delivers a high data transfer rate.

This object is achieved by an interface device according to claim 1 or 12 and by a method according to claim 15.

The present invention is based on the finding that both a high data transfer rate and host device-independent use can be achieved if a driver for an input/output device customary in a host device, normally present in most commercially available host devices, is utilized. Drivers for input/output devices customary in a host device which are found in practically all host devices are, for example, drivers for hard disks, for graphics devices or for printer devices. As however the hard disk interfaces in common host devices which can be, for example, IBM PCs, IBM-compatible PCs, Commodore PCs, Apple computers or even workstations, are the interfaces with the highest data transfer rate, the hard disk driver is utilized in the preferred embodiment of the interface device of the present invention. Drivers for other storage devices such as floppy disk drives, CD-ROM drives or tape drives could also be utilized in order to implement the interface device according to the present invention.

As described in the following, the interface device according to the present invention is to be attached to a host device by means of a multi-purpose interface of the host device which can be implemented, for example, as an SCSI interface or as an enhanced printer interface. Multi-purpose interfaces comprise both an interface card and specific driver software for the interface card. The driver software can be designed so that it can replace the BIOS driver routines. Communication between the host device and the devices attached to the multi-purpose interface then essentially takes place by means of the specific driver software for the multi-purpose interface and no longer primarily by means of BIOS routines of the host device. Recently however drivers for multi-purpose interfaces can also already be integrated in the BIOS system of the host device as, alongside classical input/output interfaces, multi-purpose interfaces are becoming increasingly common in host devices. It is of course also possible to use BIOS routines in parallel with the specific driver software for the multi-purpose interface, if this is desired.

The interface device according to the present invention comprises a processor means, a memory means, a first connecting device for interfacing the host device with the interface device, and a second connecting device for interfacing the interface device with the data transmit/receive device. The interface device is configured by the processor means and the memory means in such a way that the interface device, when receiving an inquiry from the host device via the first connecting device as to the type of a device attached to the host device, sends a signal, regardless of the type of the data transmit/receive device, to the host device via the first connecting device which signals to the host device that it is communicating with an input/output device. The interface device according to the present invention therefore simulates, both in terms of hardware and software, the way in which a conventional input/output device functions, preferably that of a hard disk drive. As support for hard disks is implemented as standard in all commercially available host systems, the simulation of a hard disk, for example, can provide host device-independent use. The interface device according to the present invention therefore no longer communicates with the host device or computer by means of a specially designed driver but by means of a program which is present in the BIOS system (Basic Input/Output System) and is normally precisely matched to the specific computer system on which it is installed, or by means of a specific program for the multi-purpose interface. Consequently, the interface device according to the present invention combines the advantages of both groups. On the one hand, communication between the computer and the interface takes place by means of a host device-specific BIOS program or by means of a driver program which is matched to the multi-purpose interface and which could be regarded as a "device-specific driver". On the other hand, the BIOS program or a corresponding multi-purpose interface program which operates one of the common input/output interfaces in host systems is therefore present in all host systems so that the interface device according to the present invention is host device-independent.

Figure 2:
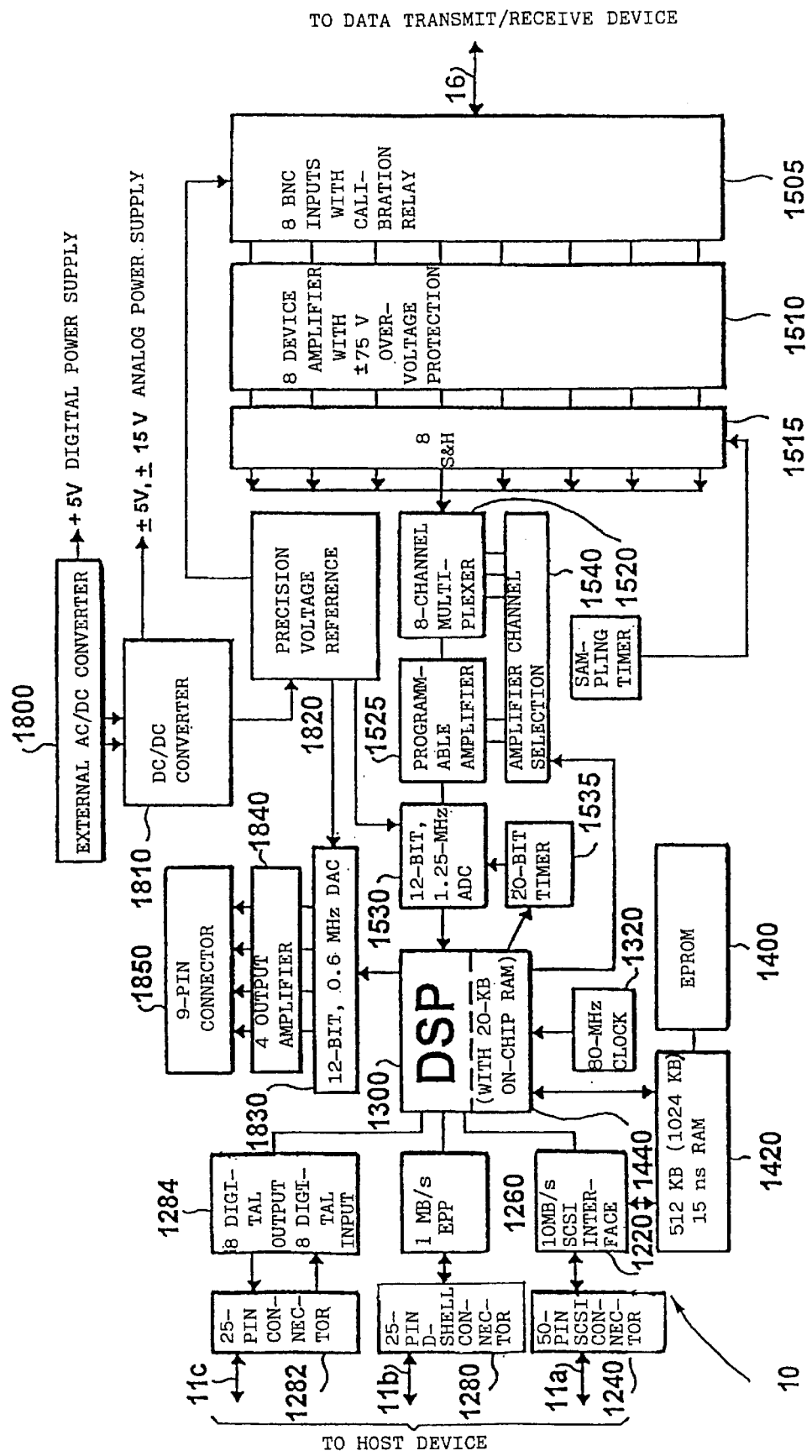

In the following, preferred embodiments of the present invention will be explained in more detail with reference to the drawings enclosed, in which:

FIG. 1 shows a general block diagram of the interface device according to the present invention; and FIG. 2 shows a detailed block diagram of an interface device according to a preferred embodiment of the present invention.

FIG. 1 shows a general block diagram of an interface device 10 according to the present invention. A first connecting device 12 of the interface device 10 can be attached to a host device (not shown) via a host line 11. The first connecting device is attached both to a digital signal processor 13 and to a memory means 14. The digital signal processor 13 and the memory means 14 are also attached to a second connecting device 15 by means of bi-directional communication lines (shown for all lines by means of two directional arrows). The second connecting device can be attached by means of an output line 16 to a data transmit/receive device which is to receive data from the host device or from which data is to be read, i.e. acquired, and transferred to the host device. The data transmit/receive device itself can also communicate actively with the host device via the first and second connecting device, as described in more detail in the following.

Communication between the host system or host device and the interface device is based on known standard access commands as supported by all known operating systems (e.g. DOS, Windows, Unix). Preferably, the interface device according to the present invention simulates a hard disk with a root directory whose entries are "virtual" files which can be created for the most varied functions. When the host device system with which the interface device according to the present invention is connected is booted and a data transmit/receive device is also attached to the interface device 10, usual BIOS routines or multi-purpose interface programs issue an instruction, known by those skilled in the art as the INQUIRY instruction, to the input/output interfaces in the host device. The digital signal processor 13 receives this inquiry instruction via the first connecting device and generates a signal which is sent to the host device (not shown) again via the first connecting device 12 and the host line 11. This signal indicates to the host device that, for example, a hard disk drive is attached at the interface to which the INQUIRY instruction was sent. Optionally, the host device can send an instruction, known by those skilled in the art as "Test Unit Ready", to the interface device to request more precise details regarding the queried device.

Regardless of which data transmit/receive device at the output line 16 is attached to the second connecting device, the digital signal processor 13 informs the host device that it is communicating with a hard disk drive. If the host device receives the response that a drive is present, it then sends a request to the interface device 10 to read the boot sequence which, on actual hard disks, normally resides on the first sectors of the disk. The digital signal processor 13, whose operating system in stored in the memory means 14, responds to this instruction by sending to the host device a virtual boot sequence which, in the case of actual drives, includes the drive type, the starting position and the length of the file allocation table (FAT), the number of sectors, etc., known to those skilled in the art. Once the host device has received this data, it assumes that the interface device 10 according to a preferred embodiment of the present invention is a hard disk drive. In reply to an instruction from the host device to display the directory of the "virtual" hard disk drive simulated by the interface device 10 with respect to the host device, the digital signal processor can respond to the host device in exactly the same way as a conventional hard disk would, namely by reading on request the file allocation table or FAT on a sector specified in the boot sequence, normally the first writable sector, and transferring it to the host device, and subsequently by transferring the directory structure of the virtual hard disk. Further, it is possible that the FAT is not read until immediately prior to reading or storing the data of the "virtual" hard disk and not already at initialization.

In a preferred embodiment of the present invention, the digital signal processor 13, which need not necessarily be implemented as a digital signal processor but may be any other kind of microprocessor, comprises a first and a second command interpreter. The first command interpreter carries out the steps described above whilst the second command interpreter carries out the read/write assignment to specific functions. If the user now wishes to read data from the data transmit/receive device via the line 16, the host device sends a command, for example "read file xy", to the interface device. As described above, the interface device appears to the host device as a hard disk. The second command interpreter of the digital signal processor now interprets the read command of the host processor as a data transfer command, by decoding whether "xy" denotes, for example, a "real-time input" file, a "configuration" file or an executable file, whereby the same begins to transfer data from the data transmit/receive device via the second connecting device to the first connecting device and via the line 11 to the host device.

Preferably, the volume of data to be acquired by a data transmit/receive device is specified in a configuration file described in the following by the user specifying in the said configuration file that a measurement is to last, for example, five minutes. To the host device the "real-time input" file then appears as a file whose length corresponds to the anticipated volume of data in those five minutes. Those skilled in the art know that communication between a processor and a hard disk consists of the processor transferring to the hard disk the numbers of the blocks or clusters or sectors whose contents it wishes to read. By reference to the FAT the processor knows which information is contained in which block. In this case, communication between the host device and the interface device according to the present invention therefore consists of the very fast transfer of block numbers and preferably of block number ranges because a virtual "real-time input" file will not be fragmented. If the host device now wants to read the "real-time input" file, it transfers a range of block numbers to the interface device, whereupon data commences to be received via the second connecting device and data commences to be sent to the host device via the first connecting device.

In addition to the digital signal processor instruction memory, which comprises the operating system of the digital signal processor and can be implemented as an EPROM or EEPROM, the memory means 14 can have an additional buffer for purposes of synchronizing data transfer from the data transmit/receive device to the interface device 10 and data transfer from the interface device 10 to the host device.

Preferably, the buffer is implemented as a fast random access memory or RAM buffer.

Further, from the host device the user can also create a configuration file, whose entries automatically set and control various functions of the interface device 10, on the interface device 10 which appears to the host device as a hard disk. These settings can be, for example, gain, multiplex or sampling rate settings. By creating and editing a configuration file, normally a text file which is simple to understand with little prior knowledge, users of the interface device 10 are able to perform essentially identical operator actions for almost any data transmit/receive devices which can be attached to the second connecting device via the line 16, thus eliminating a source of error arising from users having to know many different command codes for different applications. In the case of the interface device 10 according to the present invention it is necessary for users to note the conventions of the configuration file once only in order to be able to use the interface device 10 as an interface between a host device and almost any data transmit/receive device.

As a result of the option of storing any files in agreed formats in the memory means 14 of the interface device 10, taking into account the maximum capacity of the memory means, any enhancements or even completely new functions of the interface device 10 can be quickly implemented. Even files executable by the host device, such as batch files or executable files (BAT or EXE files), and also help files can be implemented in the interface device, thus achieving independence of the interface device 10 from any additional software (with the exception of the BIOS routines) of the host device. On the one hand, this avoids licensing and/or registration problems and, on the other hand, installation of certain routines which can be frequently used, for example an FFT routine to examine acquired time-domain data in the frequency domain, is rendered unnecessary as the EXE files are already installed on the interface device 10 and appear in the virtual root directory, by means of which the host device can access all programs stored on the interface device 10.

In a preferred embodiment of the present invention in which the interface device 10 simulates a hard disk to the host device, the interface device is automatically detected and readied for operation when the host system is powered up or booted. This corresponds to the plug-and-play standard which is currently finding increasingly widespread use. The user is no longer responsible for installing the interface device 10 on the host device by means of specific drivers which must also be loaded; instead the interface device 10 is automatically readied for operation when the host system is booted.

For persons skilled in the art it is however obvious that the interface device 10 is not necessarily signed on when the computer system is powered up but that a special BIOS routine or a driver for a multi-purpose interface can also be started on the host device during current operation of the computer system in order to sign on or mount the interface device 10 as an additional hard disk. This embodiment is suitable for larger workstation systems which are essentially never powered down as they perform, e.g. mail functions or monitor processes which run continuously, for example, in multi-tasking environments.

In the interface device according to the present invention an enormous advantage is to be gained, as apparent in the embodiment described in the following, in separating the actual hardware required to attach the interface device 10 to the data transmit/receive device from the communication unit, which is implemented by the digital signal processor 13, the memory means 14 and the first connecting device 12, as this allows a plurality of dissimilar device types to be operated in parallel in identical manner. Accordingly, many interface devices 10 can be connected to a host device which then sees many different "virtual" hard disks. In addition, any modification of the specific hardware symbolized by the second connecting device 15 can be implemented essentially without changing the operation of the interface device according to the present invention. Further, an experienced user can intervene at any time on any level of the existing second connecting device by making use of the above mentioned option of creating a configuration file or adding or storing new program sections for the second connecting device.

An important advantage of the interface device 10 of the present invention is that it also permits extremely high data transfer rates by using, for data interchange, the host device-own BIOS routines which are optimized for each host device by the host device manufacturer or BIOS system manufacturer, or by using driver programs which are normally optimized and included by the manufacturers of multi-purpose interfaces. Furthermore, due to the simulation of a virtual mass storage device, the data is managed and made available in such a way that it can be transferred directly to other storage media, e.g. to an actual hard disk of the host device without, as it were, intervention of the host device processor. The only limitation to long-term data transfer at high speed is therefore imposed exclusively by the speed and the size of the mass storage device of the host device. This is the case as the digital signal processor 13 already formats the data read by the data transmit/receive device via the second connecting device 15 into block sizes suitable for a hard disk of the host device, whereby the data transfer speed is limited only by the mechanical latency of the hard disk system of the host device. At this point, it should be noted that normally data flow from a host device must be formatted in blocks to permit writing to a hard disk and subsequent reading from a hard disk, as known by those skilled in the art.

The said data transfer rate can be increased further by setting up a direct memory access (DMA) or RAM drive in the host system. As those skilled in the art know, the setting up of a RAM drive requires processor resources of the host device, with the result that the advantage of writing the data to a hard disk drive of the host device essentially without the need for processor resources is lost.

As described above, a data buffer can be implemented in the memory means 14 to permit independence in terms of time of the data transmit/receive device attached to the second connecting device from the host device attached to the first connecting device. This guarantees error-free operation of the interface device 10 even for time-critical applications in multi-tasking host systems.

FIG. 2 shows a detailed block diagram of an interface device 10 according to the present invention.

A digital signal processor (DSP) 1300 is, in a manner of speaking, the heart of the interface device 10. The DSP can be any DSP but preferably has a 20-MB on-chip random access memory (RAM). Certain instruction sets, for example, can be stored in the RAM already integrated in the DSP. An 80-MHz clock generator is attached to the DSP 1300 in order to synchronize the DSP. The DSP implements a fast Fourier transformation (FFT) in real time and also optional data compression of the data to be transferred from the data transmit/receive device to the host device in order to achieve greater efficiency and to permit interoperation with host devices which have a smaller memory.

In the preferred embodiment of the interface device 10 shown in FIG. 2, the first connecting device 12 of FIG. 1 contains the following components: an SCSI interface 1220 and a 50-pin SCSI connector 1240 for attachment to an SCSI interface present on most host devices or laptops. The SCSI (small computer system interface) interface 1220 translates the data received via the SCSI connector 1240 into data understood by the DSP 1300, as known by those skilled in the art. Further, the first connecting device 12 comprises an EPP (enhanced parallel port) with a data transfer rate of approx. 1 MBps which delivers a more moderate data transfer rate of 1 MBps by comparison to the data transfer rate of 10 MBps of the SCSI interface. The EPP 1260 is connected to a 25-pin D-shell connector 1280 to permit attachment to a printer interface of a host device for example. Optionally, the first connecting device 12 also comprises a 25-pin connector 1282 which permits the attachment of 8 digital outputs and 8 digital inputs 1284 at a host device.

Preferably, the second connecting device comprises 8 BNC inputs with the calibration relay 1505, a block 1510 with 8 device amplifiers with an overvoltage protection of ±75 V, this block being connected in turn to 8 sample/hold (S&H) circuits 1515. The calibration relays are relays which permit controlled changeover between a test voltage and a calibration reference voltage. Each sample/hold circuit is connected to a corresponding input of an 8-channel multiplexer 1520 which feeds its output signals via a programmable amplifier 1525 into an analog/digital converter (ADC) with 12 bit and 1.25 MHz 1530 and to the DSP 1300. The ADC 1530 is controlled by means of a 20-bit timer 1535, as known by persons skilled in the art. The programmable amplifier 1525 and the 8-channel multiplexer 1520 are controlled via an amplifier channel selection circuit 1540 which is in turn controlled by the DSP 1300.

The complete interface device 10 is supplied with power by an external AC/DC converter 1800 which delivers a digital supply voltage of ±5 V and is attached to a DC/DC converter 1810 which can deliver analog supply voltages of ±5 V and ±15 V as required for the interface device 10. Further, the DC/DC converter controls a precision voltage reference 1820 which controls the 8 BNC inputs 1505 and the ADC 1530 as well as a digital/analog converter (DAC) 1830 which permits, via an output amplifier block with 4 output amplifiers 1840 and a 9-pin connector 1850, analog output direct from the DSP 1300 to an output device, e.g. printer device or monitor device, which can be attached via the 9-pin connector 1850, thus providing the option of monitoring the data transferred to the host device or also, for example, of viewing an FFT to obtain rapid and comprehensive data analysis without using processor time of the host device.

In FIG. 2 the memory means 14 of FIG. 1 is implemented by an EPROM 1400 which, in a preferred embodiment of the present invention, contains the operating system of the digital signal processor 1300. A random access memory with an access time of 15 ns and a size of 512 KB or optionally 1024 KB 1420 serves as a data buffer to achieve independence in terms of time of the output line 16 from the output lines 11a, 11b and 11c to the data transmit/receive device and to the host device respectively. As described above, in a preferred embodiment of the present invention the digital signal processor 1300 already contains a 20-KB on-chip RAM 1440 which can store certain instruction sets, functions and also smaller application software units.

The connection, symbolized by the line 16, of the interface device 10 to any data transmit/receive device implements, by means of the blocks 1505–1535, an analog input with a sampling rate of 1.25 MHz and quantization of 12 bits. There are 8 channels with an overvoltage protection of ±75 V. By means of the programmable amplifier 1525 the channels can be programmed independently of each other in voltage ranges up to a maximum of ±10 V. Unused channels can be grounded internally to reduce channel intermodulation. The block 1515 is implemented as a monolithic high-precision, high-speed sample/hold amplifier for simultaneous sampling of all channels. The precision voltage reference 1820 provides a high-precision, temperature-compensated monolithic energy gap voltage reference for auto-calibration of each channel and each gain. Further, offset fine adjustment for each channel is implemented by the same.

The blocks 1830, 1840 and 1850 implement a direct analog output for the digital signal processor 1300, and the DAC 1830 provides a data transfer rate of 625 kHz and a quantization of 12 bits. The block 1840 comprises 4 channels with a common output latch.

Further, the interface device 10 comprises a digital input/output device implemented by the blocks 1284 and 1282. Here there are 8 digital inputs, 8 digital outputs with a common latch, and the digital port can be attached preferably to a side panel of the interface device 10 so that the port itself can easily be accessed.

The digital signal processor 1300 provides on-board digital data processing. In particular, it is a high-performance DSP with a clock speed of 80 MHz and a 20-bit timer 1535.

As described above, the first connecting device 12 comprises the SCSI interface 1220 with a peak transfer rate of 10 MBps. An optional PCMCIA-to-SCSI adapter permits high-speed communication with laptop computers which are desirable and in widespread use, particularly by mobile service technicians. The EPP 1260 with its associated connector 1280 permits data transfer at a more moderate rate.

As described above, the interface device 10 is supplied with power by means of an external AC/DC adapter which has a universal power input (85–264 VAC, 47–63 Hz). Interference suppression complies with the standards EN 55022, curve B and FFC, Class B). Further, it is also in accordance with international safety regulations (TÜV, UL, CSA). The interface device 10 is externally shielded and achieves a value of 55 dB at 30–60 MHz and a value of approximately 40 dB at 1 GHz, and therefore complies with the MILSTD 285-1 standard.

As described above, communication between the host device and the multi-purpose interface can take place not only via drivers for input/output device customary in a host device which reside in the BIOS system of the host device but also via specific interface drivers which, in the case of SCSI interfaces, are known as multi-purpose interface ASPI (advanced SCSI programming interface) drivers. This ASPI driver, which can also be referred to as an ASPI manager, is specific to a special SCSI host adapter, i.e. to a special multi-purpose interface, and is normally included by the manufacturer of the multi-purpose interface. Generally speaking, this multi-purpose interface driver has the task of moving precisely specified SCSI commands from the host system program to the host system SCSI adapter. For this reason, the command set is almost identical to that of the SCSI interface itself. Essentially, only status and reset commands for the host adapter have been added.

The ASPI driver can be used if the hard disk was not already addressable at boot time or if the SCSI-related BIOS routines of the host computer were still disabled. Here too, the steps needed to initialize the interface device, preferably as a virtual hard disk, are similar to the steps taken when initializing at boot time.

In general terms, the ASPI manager comprises two sides. One side is the proprietary, hardware-oriented side. It is responsible for converting all commands into a form required by the corresponding multi-purpose interface. The hardware-oriented side of the ASPI driver is therefore matched to a very specific type of multi-purpose interface or SCSI interface. The other side is known as the user software side. This side is totally independent of the proprietary operating characteristics of the SCSI adapter and is therefore identical for all SCSI interfaces. This permits SCSI programming which is however independent of the individual SCSI adapter types.

In contrast to communication between the host device and the interface device according to the present invention on the basis of a BIOS driver, the use of such an ASPI driver for communication between the host device and the interface device according to the present invention allows various further possibilities of the SCSI multi-purpose interface to be exploited. In the case described above, the interface device which preferably signs on and behaves as a virtual hard disk is detected by the BIOS driver of the host computer at boot time and is configured as a hard disk. This step does not however support active requests sent by the interface device to the host computer. If however the virtual hard disk wishes to write data actively to, for example, a hard disk of the host computer or wishes to initiate communication with the processor of the host computer, the host computer must recognize the request of the virtual hard disk and tolerate a further issuer of instructions on its bus. If the interface device behaves solely like a virtual hard disk, it would always receive and never issue commands. The BIOS has no objections to an additional issuer of commands that actively wishes to place data on the bus of the host device but the BIOS does not support the host device in recognizing corresponding requests of the interface device or in granting the interface device permission to access the bus.

Using the ASPI manager the interface device according to the present invention can now obtain active access to an SCSI hard disk of the host device connected to the same SCSI bus which, in contrast to the interface device, cannot be a virtual but a real SCSI mass storage device or also a further interface device according to the present invention. Thereupon, the interface device according to the present invention can write the desired data to the SCSI hard disk of the host computer totally independently of the host computer or can communicate with the same in some other manner. The interface device according to the present invention therefore initially behaves passively as a virtual hard disk and then, as required and using the driver software for the multi-purpose interface, actively on the same SCSI bus. This means however that the interface device according to the present invention, using a driver software for the multi-purpose interface which comprises the BIOS routines customary in host devices and simultaneously provides the option of active participation, can, regardless of the type of the data transmit/receive device attached to the second connecting device, behave initially as a virtual and at the same time passive hard disk but can, as required, participate actively on the bus so as to be able to initiate communication directly with other SCSI hard disks of the host device by bypassing the processor of the host device.

Using a standard interface of a host device, the interface device according to the present invention permits communication with any host device. By simulating an input/output device to the host device and, in a preferred embodiment, by simulating a virtual mass storage device, the interface device 10 is automatically supported by all known host systems without any additional sophisticated driver software. The simulation of a freely definable file structure on the "virtual" hard disk provides simple operation and expansion options and, through the implementation of any programs, independence from special software implemented on the host device. Help files included on the interface device 10 and plug-and-play support ensure ease of use even in portable, flexible host devices. Despite the very simple user interface, experienced users are free at any time to intervene in the functions of the interface device 10 on system level. The interface device 10 thus provides a universal solution which can cover the entire spectrum of possible data transmit/receive devices.

What is claimed is:

1. An interface device for communication between a host device, which comprises drivers for input/output devices customary in a host device and a multi-purpose interface, and a data transmit/receive device comprising the following features:

a processor;

a memory;

a first connecting device for interfacing the host device with the interface device via the multi-purpose interface of the host device; and a second connecting device for interfacing the interface device with the data transmit/receive device, wherein the interface device is configured by the processor and the memory in such a way that the interface device, when receiving an inquiry from the host device as to the type of a device attached to the multi-purpose interface of the host device, sends a signal, regardless of the type of the data transmit/receive device attached to the second connecting device of the interface device, to the host device which signals to the host device that it is a storage device customary in a host device, whereupon the host device communicates with the interface device by means of the driver for the storage device customary in a host device, and wherein the interface device is arranged for simulating a virtual file system to the host, the virtual file system including a directory structure.

2. An interface device in accordance with claim 1, in which the directory structure has a configuration file for setting and controlling functions of the interface device or an executable or a batch file for conducting a routine stored in the memory or a data file used for transferring data from the data transmit/receive device to the host device or a help file for giving help on handling the interface device.

3. An interface device in accordance with claim 2 wherein the configuration file is a text file.

4. An interface device in accordance with claim 2 wherein the executable file includes a Fast Fourier Transform routine for transforming data acquired by the second connecting device into the frequency domain and for examining frequency domain data.

5. An interface device in accordance with claim 2 wherein the executable file includes a data compression routine for compressing data to be transmitted from the data transmit/receive device to the host device.

6. An interface device in accordance with claim 1 wherein, in response to a request from the host to read a boot sequence, the processor is arranged to send a virtual boot sequence to the host.

7. An interface device in accordance with claim 6 wherein the virtual boot sequence includes a starting position and a length of a file allocation table, an indication of a type of the storage device or a number of sectors of the storage device.

8. An interface device in accordance with claim 7 wherein, in response to a request from the host to display a directory of the storage device, a processor is arranged for transferring the file allocation table and the directory structure to the host.

9. An interface device in accordance with claim 1 wherein the file allocation table and the directory structure is transferred to the host in response to a request from the host to read data from or store data to the storage device.

10. An interface device in accordance with claim 1 wherein the directory structure includes a data file for transferring data from the data transmit/receive device to the host device wherein the processor is arranged to interpret a request from the host to read the data file as a request for a data transfer from the data transmit/receive device to the host, so that data is transmitted from the second connecting device to the first connecting device and to the host.

11. An interface device in accordance with claim 10 wherein the directory structure further includes a configuration file for specifying a time period for a measurement by the data transmit/receive device, wherein the interface device is arranged for simulating a length of the data file to the host that corresponds to an anticipated volume of data produced by the data transmit/receive device in the specified time period.

12. An interface device in accordance with claim 1 wherein the file allocation table includes information on numbers of blocks occupied by the data file wherein the interface device is arranged for receiving block numbers or a block number range from the host when the host wants to read the data file, and wherein the interface device is arranged to start a data transfer to the host, when the block numbers or the block number range is received from the host.

13. An interface device in accordance with claim 12 wherein the processor is arranged for formatting the data acquired by the second connecting device into blocks having a predetermined size, the predetermined size being suited for the storage device.

14. An interface device in accordance with claim 1 wherein the functions are gain, multiplex or synchronization settings of the second connecting device.

15. An interface device in accordance with claim 1 wherein the storage device is a hard disk.

16. An interface device in accordance with claim 1 wherein the memory has a data buffer for permitting independence in terms of time of the data transmit/receive device attachable to the second connecting device from the host device attachable to the first connecting device.

17. An interface device for communication between a host device, which comprises a multi-purpose interface and a specific driver for this interface, and a data transmit/receive device comprising the following features:

a processor;

a memory;

a first connecting device for interfacing the host device with the interface device via the multi-purpose interface of the host device; and a second connecting device for interfacing the interface device with the data transmit/receive device, where the interface device is configured using the processor and the memory in such a way that the interface device, when receiving an inquiry from the host device as to the type of a device attached at the multi-purpose interface of the host device, sends a signal, regardless of the type of the data transmit/receive device attached to the second connecting device of the interface device, to the host device which signals to the host device that it is a storage device customary in a host device, whereupon the host device communicates with the interface device by means of the specific driver for the multi-purpose interface, and wherein the interface device is arranged for simulating a virtual file system to the host, the virtual file system including a file allocation table and a directory structure.

18. A method of communication between a host device, which comprises drivers for input/output devices customary in a host device and a multi-purpose interface, and a data transmit/receive device via an interface device comprising the following steps:

interfacing of the host device with a first connecting device of the interface device via the multi-purpose interface of the host device;

interfacing of the data transmit/receive device with a second connecting device of the interface device;

inquiring by the host device at the interface device as to the type of device to which the multi-purpose interface of the host device is attached;

regardless of the type of the data transmit/receive device attached to the second connecting device of the interface device, responding to the inquiry from the host device by the interface device in such a way that it is a storage device customary in a host device, whereupon the host device communicates with the interface device by means of the usual driver for the storage device, and wherein the interface device is arranged for simulating a virtual file system to the host, the virtual file system including a file allocation table and a directory structure.

* * * * *